Figure 1:
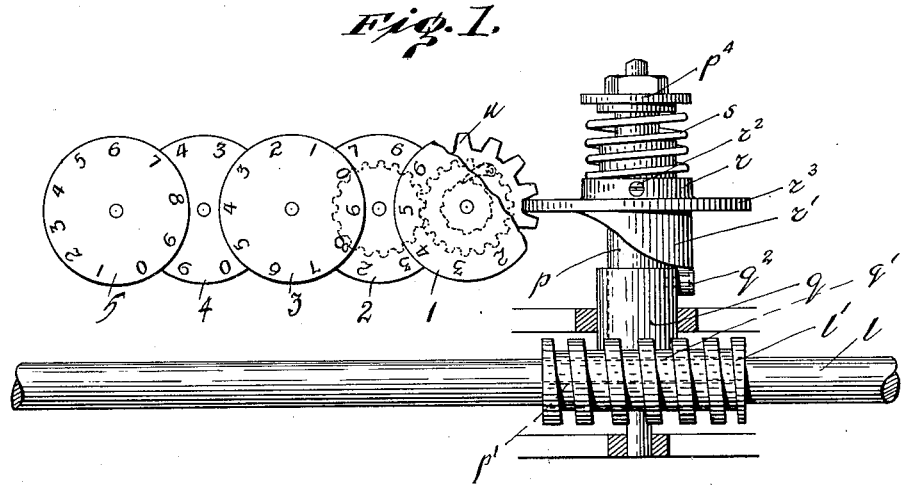

V. A. ZIPSER.
MECHANISM FOR TOTALING THE NUMBER OF REVOLUTIONS OF A ROTARY BODY.
APPLICATION FILED APR. 24, 1913.

1,100,278.

Patented June 16, 1914.

ns of a Rotary Body.

UNITED STATES PATENT OFFICE.

VICTOR ALFRED ZIPSER, OF NEW YORK, N. Y.

MECHANISM FOR TOTALING THE NUMBER OF REVOLUTIONS OF A ROTARY BODY.

1,100,278. Specification of Letters Patent. Patented June 16, 1914.

Application filed April 24, 1913. Serial No. 763,443.

*To all whom it may concern:*

Be it known that I, VICTOR ALFRED ZIPSER, a subject of the Russian Emperor, residing at New York, in the county of New York and State of New York, have invented certain new and useful Improvements in Mechanism for Totaling the Number of Revolutions of a Rotary Body, of which the following is a specification.

The present invention relates to mechanism for totaling the number of revolutions made by vehicles, as automobiles or the like, and the object thereof is to provide a mechanism of great efficiency and very simple construction.

To accomplish my object, I have devised a mechanism in which the transmission of movement from the driving source or prime mover to the indicating finger is perfected through the medium of mercury or other fluid.

My invention will be clearly understood from the accompanying drawing, in which similar reference characters denote corresponding parts and in which—

Figure 2:
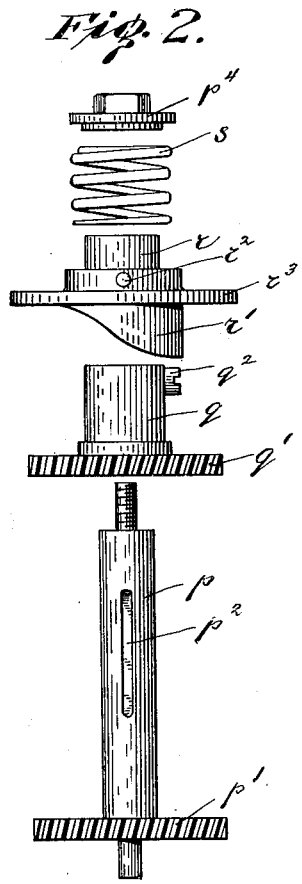
Figure 3:
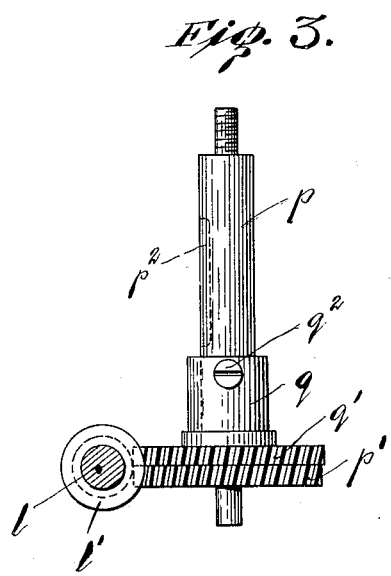

Figure 1 is a plan view of my new mechanism and Figs. 2 and 3 are details thereof.

The mechanism substantially consists of a shaft $p$ to one end of which a worm-wheel $p'$ is fixed, having a certain number of teeth, a sleeve $q$ adapted to be rotatively mounted on the shaft $p$ and having fixed to one of its ends a worm-wheel $q'$ having one tooth more than the wheel $p'$. A second sleeve $r$ provided at one end with a cam shaped flange $r'$ is adapted to fit on shaft $p$ and is connected to the latter by a pin or screw bolt $r^2$ which engages a longitudinal recess $p^2$ in the shaft, whereby the sleeve $r$ will be permitted to move longitudinally on said shaft, but prevented from independently rotating thereon. The sleeve $r$ is depressed into its lowest position by a spring $s$ arranged between itself and a screw nut or head piece $p^4$ arranged on the opposite end of the shaft $p$. By the spring $s$ the cam shaped flange will be held constantly in contact with a projection or pin $q^2$ extending from the outer circumference of the sleeve $q$, and as the latter revolves, the pin $q^2$, riding along the edge of the cam shaped flange, will impart to the sleeve $r$ a slight axial movement. The sleeve $r$ is provided with a circular circumferential flange $r^3$, which extends into the space between two teeth of a gear $u$ which is one of a series of the totaling gears for feeding the number plates, 1, 2, 3, 4 and 5 in well known manner.

The shaft $p$ and the sleeve $q$ are supported in suitable bearings in such a manner, that the two worm wheels $p'$ and $q'$ simultaneously mesh with the worm $l'$. When the wheel $p'$ makes one full revolution, the wheel $q'$ makes a full revolution and a fraction of a revolution, owing to its additional tooth, and during that fraction of a revolution the sleeve $r$ is caused to slightly rise feeding the wheel $u$.

Assuming that the wheel $p'$ has fifty teeth and the wheel $q'$ fifty one teeth, then, when the wheel $p'$ has made fifty revolutions, the wheel $q'$ will complete an additional full revolution or have made fifty one revolutions. During these fifty one revolutions the sleeve $r$ is once lifted and dropped and its flange $q^2$ has fed the wheel $u$ to an extent of one tooth, that will denote, say, one mile, and so forth.

What I claim and desire to secure by Letters Patent is:

In a mechanism for totaling the number of revolutions of a rotary body, the combination with number wheels and a driven worm, of two independently movable worm-gears meshing simultaneously with the latter, and of which one has one tooth more than the other, an axially movable cam acted upon by a projection on said last named gear and means on said cam to feed the number wheels as it is being displaced by said projection.

In testimony whereof I affix my signature in presence of two witnesses.

VICTOR ALFRED ZIPSER.

Witnesses:
 JAMES H. GOGGIN,
 MAX D. ORDMANN.

Copies of this patent may be obtained for five cents each, by addressing the "Commissioner of Patents, Washington, D. C."